United States Patent [19]

Mulcihy, Jr.

[11] Patent Number: 4,800,914
[45] Date of Patent: Jan. 31, 1989

[54] GAS PRESSURE RELIEF APPARATUS

[75] Inventor: Thomas W. Mulcihy, Jr., Freeport, Tex.

[73] Assignee: The Dow Chemical Company, Midland, Mich.

[21] Appl. No.: 132,296

[22] Filed: Dec. 15, 1987

[51] Int. Cl.⁴ ............................................. F16K 13/10
[52] U.S. Cl. .............................. 137/247.45; 137/251.1; 137/253
[58] Field of Search ................... 137/247, 251.1, 253; 73/747

[56] References Cited

U.S. PATENT DOCUMENTS

| | | | |
|---|---|---|---|
| 772,037 | 10/1904 | Harris | 137/247 X |
| 1,697,717 | 1/1929 | Corwin | 73/747 |
| 2,489,524 | 11/1949 | Crabbe | 137/251.1 X |
| 2,501,461 | 3/1950 | Wirth | 137/251.1 |
| 2,662,409 | 12/1953 | Dwyer | 73/747 |
| 2,714,168 | 7/1955 | Hencke et al. | 73/747 X |
| 3,122,924 | 3/1964 | Pall | 73/747 |
| 3,222,259 | 12/1965 | Wall, Jr. | 137/251.1 X |
| 4,655,242 | 4/1987 | Hamazaki et al. | 137/251.1 X |

FOREIGN PATENT DOCUMENTS 1175924 8/1964 Fed. Rep. of Germany ... 137/251.1
2001415 1/1979 United Kingdom ................ 137/247

Primary Examiner—John Rivell
Attorney, Agent, or Firm—Joe R. Prieto

[57] ABSTRACT

A pressure relief device for a process or pipeline including a vertical column, preferably open to the atmosphere near the top, having a certain level of liquid therein and a conduit loop in fluid communication with the column and attached to the column near the bottom of the column and generally extending upward to a predetermined distance from the bottom to a point wherein the conduit is in fluid communication with the pipeline, the conduit having a certain level of liquid which is dependent upon the column liquid level, the pressure in the pipeline, and the density of the liquid, the column having a diameter and height large enough to prevent entrainment of the liquid when the pressure in the pipeline is relieving.

11 Claims, 2 Drawing Sheets

GAS PRESSURE RELIEF APPARATUS

BACKGROUND OF THE INVENTION

This invention relates to a gas pressure relief device. More particularly, this invention relates to a liquid column safety relief device for use on a process or pipeline.

There are several gas pressure relief safety devices available to industry. Such devices are used to relieve a pressure surge to avoid damage to personnel or equipment.

Mechanical devices such as valves have the disadvantage of frequent maintenance to prevent leakage, to maintain set relieving pressure, and to assure operability. The valves are generally not available in sizes over a 12 inch inlet diameter. The spring and pallet loaded type valves leak at pressures closer than 10% of the set relieving pressure. The pilot operated type valves have elastomer parts that limit their application. Chattering, that is, rapid opening and closing of the valve during discharge, can destroy valve seats or entire valves.

Rupture disks avoid the maintenance encountered with use of a valve, but the disks must be replaced after each relief. The rupture disks also do not close to retain the process contents after relieving and are subject to corrosion and fatigue which can cause leaking and accidental relieving below the set relieving pressure.

Another known gas pressure relief safety device is the liquid filled U-leg. The U-leg safety device is essentially a downward loop of pipe partially filled with liquid. This device solves the cost, maintenance, and leakage faults of the valves and rupture disks, but, like the rupture disk, it does not close to retain the process contents after relieving. When the U-leg discharges, the liquid is blown from the U-leg and entrained in the discharging gasses. Attempts to refill the leg without stopping the gas flow, result in the liquid being blown through as fast as it is introduced. Therefore, the process must be interrupted in order to refill the liquid leg.

It is desired to solve the problems associated with the above prior art devices by providing a novel gas pressure relief device which will seal reliably from full vacuum to the set relieving pressure, will relieve a pressure surge without interrupting the process on which it is installed, and will relieve dependably at the precise set relieving pressure.

More particularly, it is desired to provide a liquid-column safety device which has the following important advantages over safety valves and rupture disks:

1. The liquid-column can be built for relief of very low pressures, for example about 0.05 psig.
2. The liquid-column can be built in very large sizes not available in other safety relief devices.
3. The liquid-column does not leak or simmer when operated at pressures near the relief pressure.
4. The liquid-column's relief pressure is accurate and does not require frequent calibration and maintenance.
5. The liquid-column's resealing pressure is precise, predictable, and the same as it's relieving pressure.
6. The liquid-column does not wear out or destroy itself by bursting (rupture disk) or chattering (safety valve) while relieving.
7. The relieving pressure of the liquid-column can be changed without interrupting the process, e.g., the liquid-column can be set to relieve at different pressures by varying the amount of liquid in the column without interrupting the process.
8. The liquid-column can handle hot discharged which will be cooled and diluted by the liquid-column's seal liquid which, in turn, will reduce the hot discharges' volume and flammability.
9. The liquid-column does not contain any soft seats which can be damaged by hot discharges.
10. The noise level caused by relieving gas through the liquid-column is much lower.
11. The liquid-column does not require replacement after a relief.
12. The liquid-column can operate safely much closer to the relieving pressure.
13. The liquid-column's relieving pressure is precise.
14. The liquid-column's relieving pressure is not affected by corrosion or fatigue.

SUMMARY OF THE INVENTION

This invention is directed to a pressure relief device for a process or pipeline comprising a vertical column having a level of liquid therein and a conduit in fluid communication with the column and attached to the column near the bottom of the column and generally extending upward to a predetermined distance from the bottom to a point wherein the conduit is in fluid communication with the pipeline, the conduit having a level of liquid therein, the column having a diameter and height large enough to prevent entrainment of the liquid when the pressure in the pipeline is relieving.

DETAILED DESCRIPTION OF THE PREFERRED EMBODIMENTS

In accordance with the present invention there is provided a gas pressure relief device including a column having a predetermined level of a seal-liquid therein and a conduit loop connected near the bottom of the column running upward to at least a height that will assure that the seal-liquid will remain in the column. The conduit loop is connected to a process or a pipeline having gasses flowing therethrough. The column diameter is usually larger than the conduit diameter and is sized so that the gasses when flowing at the maximum relieving rate will not blow the seal-liquid from the column. For a more detailed description of the sizing calculations for the column the following reference is useful: "Perry's Chemical Engineering Handbook" sixth edition Robert H. Perry, Don Green, McGraw Hill 1984, pp 18-6, 18-7.

The minimum height of the column is generally not more than five times the height of the seal-liquid above the conduit connection to the column or tower. This height will normally contain the aerated liquid, foam, and spray generated when relieving. If the column diameter is generously sized, the height of the column can be reduced. If foaming is severe, both the diameter and the height will have to be increased. Another restriction on size is encountered when the process utilized can produce a vacuum. In this instance, the size of the column should be large enough that the seal-liquid does not fall below the connection of the column and the conduit when a vacuum is produced by the process pipeline. If the column is undersized, a vacuum could cause gasses from the column to be drawn into the process.

Figure 1:
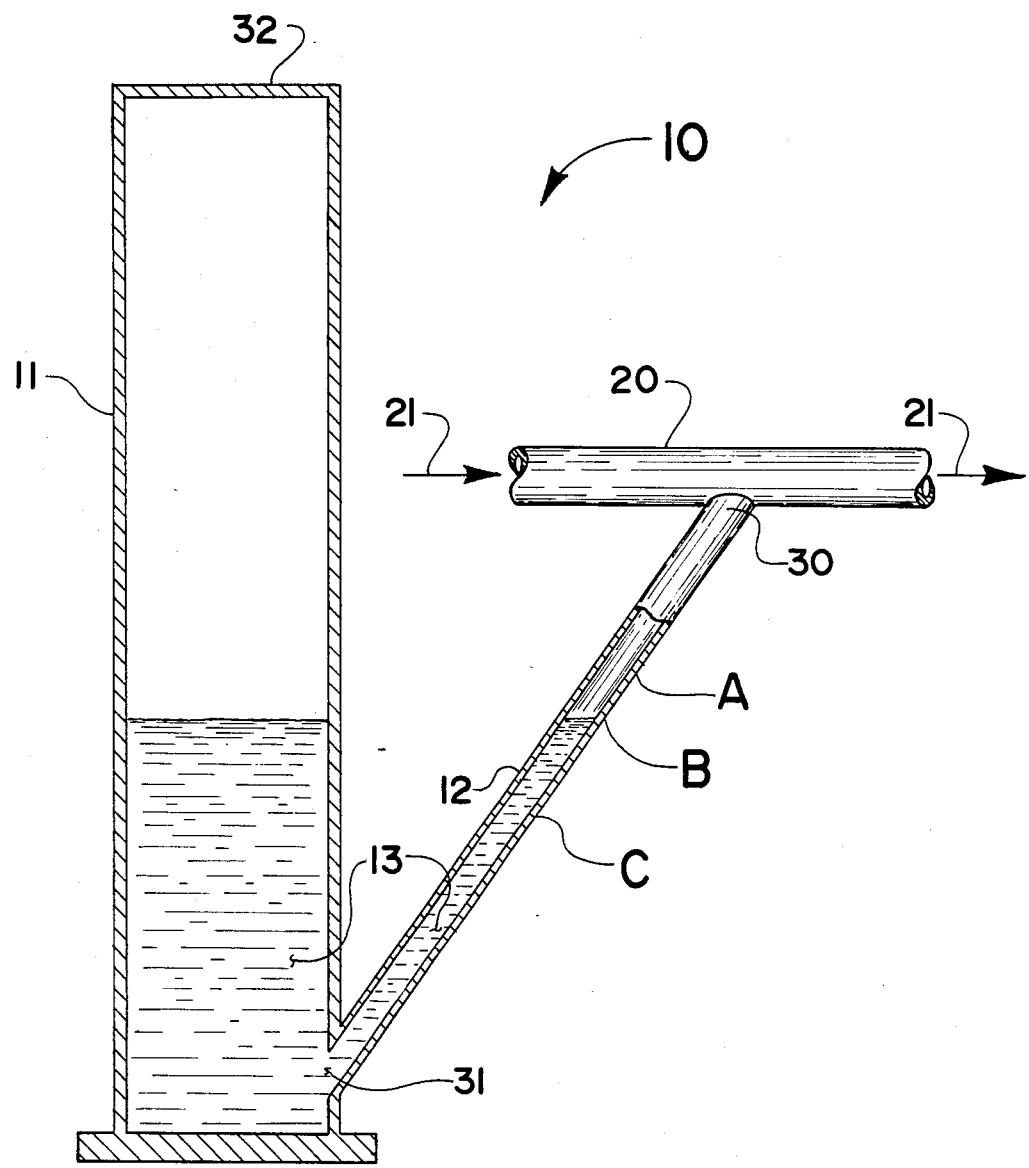
FIG. 1 is a partially schematic and partially cross-sectional view showing one embodiment of the pressure relief device of the present invention.

With reference to FIG. 1, there is shown one embodiment of a pressure relief apparatus of the present invention, generally indicated by reference number 10, and a process system pipeline 20 connected to the pressure relief apparatus 10 at point 30. The pressure relief apparatus 10 includes a column 11 and a conduit 12 in fluid communication with column 11 near its bottom at point 31. The column 11 is generally vertically disposed and may be open to the atmosphere, connected to a relief header, or connected to a flare at point 32. The column 11 shown in FIG. 1 is cylindrical in shape but can be any shape desired. The conduit 12 is connected to process pipeline 20 at point 30. A process stream 21 runs through the process pipe 20 to a use point or to other equipment for further processing (not shown).

The column 11 and conduit 12 both contain a seal-liquid 13 at a level which is predetermined to achieve the desired relieving pressure. The liquid level in the conduit 12 is shown in FIG. 1 at point B. The liquid height at point B would exist when stream 21 was at atmospheric pressure which would be the same pressure of the column at point 32. If stream 21 were at a lower pressure, the liquid level in the conduit 12 would be higher (for instance at point A). If stream 21 were at a higher pressure, the liquid level in conduit 12 would be lower (for instance at point C). The seal-liquid 13 used in the column and conduit can be any liquid which is compatible with the process fluid stream. The seal-liquid must also be ecologically safe if it is in contact with the atmosphere. Preferably, water is used as the column and conduit seal-liquid.

When the process fluid stream 21 is a substantially clean gaseous product, the apparatus shown in FIG. 1 may be adequate. However, if the process fluid stream 21 of the present invention contains liquids, corrosive components, tar-forming components, polymerizable components, condensible components, or components otherwise undesirable in contact with the seal-liquid, some or all of the added features shown in FIG. 2 may be desirable.

Figure 2:
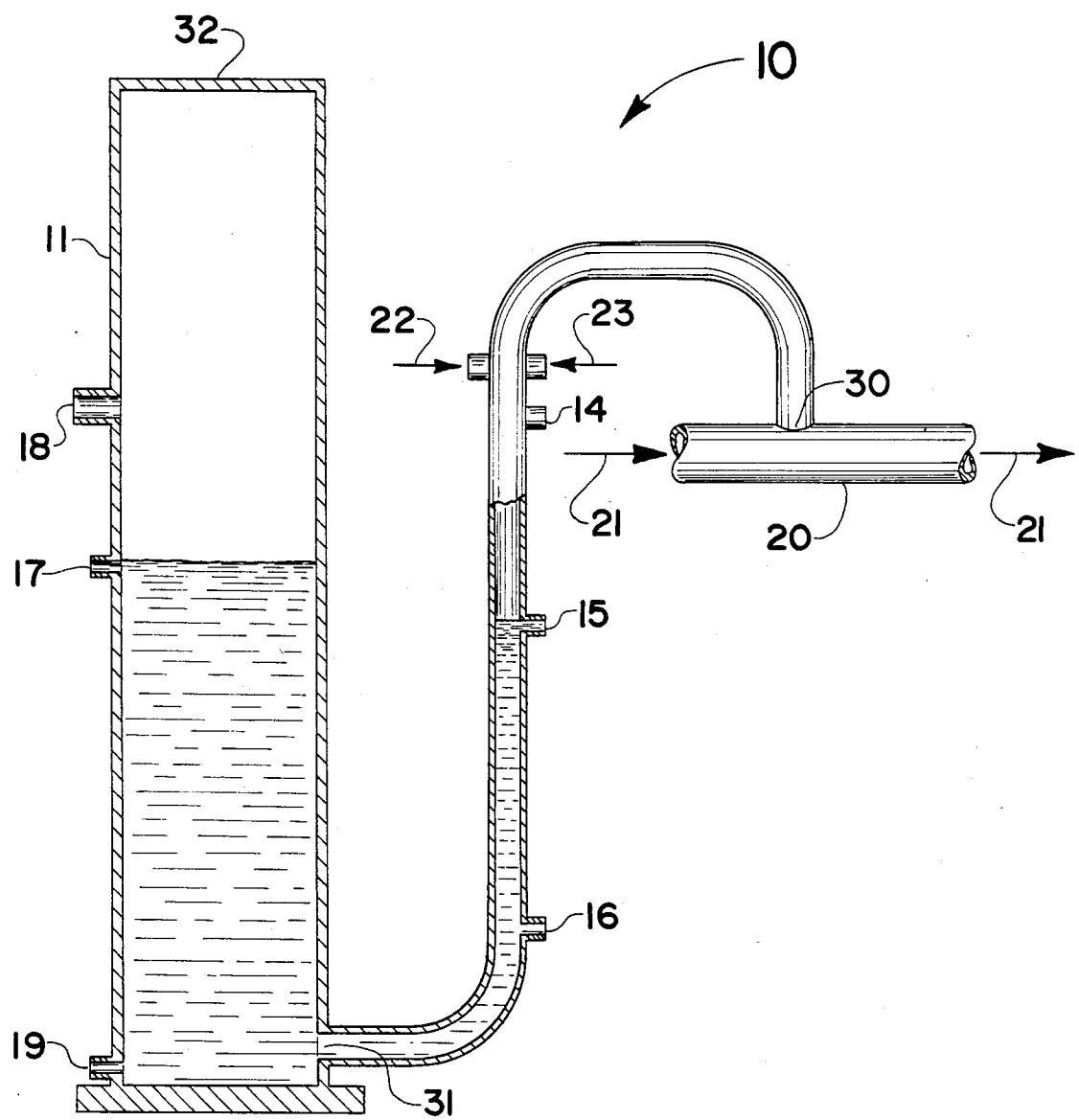
FIG. 2 is a partially schematic and partially cross-sectional view showing another embodiment of the pressure relief device of the present invention.

In FIG. 2, there is shown another embodiment of the present invention including the column 11 and conduit 12 connected to a process stream pipeline 20 at point 30. A gas purge stream 22 is desirable if stream 21 contains condensible components that could polymerize or otherwise foul the conduit, or are undesirable for other reasons such as corrosion. The gas purge stream 22 is preferably a noncondensible gas, such as hydrogen, but steam, in some instances, may also be used successfully.

If liquids are present in process stream 21, conduit 12 preferably extends upward from pipeline 20 from point 30 such that process stream liquids are excluded from entering the relief apparatus during normal process operation. Preferably, the conduit 12 extends upward from pipeline 20 at least one conduit diameter. More preferably, the conduit 12 has a bottom portion disposed generally linear and perpendicular to the column 11, a middle portion disposed generally linear and parallel to the column 11 and a top portion in the form of an inverted U-shape attached to the pipeline 20.

A flush liquid stream 23 is useful to remove floating liquids or solids in conjunction with scum removal tube members or nozzles 14, 15, and 16. The flush liquid would normally be of the same composition as the seal-liquid.

A scum removal tube member or nozzle 17 is also disposed in column 11 preferably at the seal-liquid level for removing a layer of undesirable components from the surface of the seal-liquid.

A tube member or nozzle 18 is used to provide a means for filling the column 11 or for providing a flush stream to the column.

A drain 19 is used to provide a means for removing settlement from the bottom of column 11 or lowering the level of seal-liquid in the column 11.

If an accidental or intentional vacuum is created in the process stream 21, the conduit 12 should have a high point such that the seal-liquid will not be sucked into the process. For example, when water is used as the seal-liquid, the high point height is preferably about 34 feet above the liquid level in the column 11.

The liquid-column safety device is useful in a process pipeline system wherein the fluid stream in the process pipeline is, for example, a hydrocarbon gas stream. Other process fluid streams include, for example, oxygen, nitrogen, air, inert gases, and any other gases that are insoluble or slightly soluble in the seal-liquid. The liquid-column device can also be used to protect equipment containing toxic materials such as chlorine or carbon monoxide. However, in such cases relief should be through scrubbers, flares, or other devices designed to prevent release to the atmosphere.

The liquid-column relief device is advantageously used in low pressure systems, for example, systems requiring relieving pressures from about 0.05 to about 15 psig. The useful temperature range of the liquid-column relief apparatus is only limited by the seal-liquid used which can be between the freezing point and the boiling point of the seal-liquid.

The liquid-column relief device is also useful downstream from a valve or rupture disk on high pressure processes. When the valve or disk opens, the released fluids are cooled, partially condensed, and diluted. This reduces the hazards of fire and explosion. Noise is also greatly attenuated.

The large heat capacity of the seal-liquid can cool the fluids being relieved. If water or another nonflammable liquid is used for the seal-liquid, the discharged fluid will be both cooled and diluted. This will reduce the hazard of a flammable gas release. These benefits are also useful when the device is used as a downstream device on a valve or rupture disk in an application where pressures are too high for practical application of the liquid column as the primary relief device.

If desired, the set relieving pressure of the liquid column can be varied by increasing or decreasing the level of seal-liquid. This can be done without any process interruption.

Because the device does not leak when it is operating close to its relieving pressure (characteristic of valves), and will not fatigue and open below its set pressure (characteristic of rupture disks), it enables the process to operate closer to its equipment design pressure without danger of process interruption from accidental relieving. This also enables the set relieving pressure to be set closer to the process operating pressure so that the relieving pressure is lower and the discharge is less violent.

After relieving, the retained seal-liquid reestablishes the seal. This minimizes the loss of process materials, and can avoid a process shutdown because the pressure will not fall below the set relieving pressure.

The present invention is further illustrated by the following example, but is not to be limited thereby.

EXAMPLE

A column having a diameter of about five feet and a height of about 46 feet was built in the field. A conduit two feet in diameter was connected to the column near the bottom and then connected to a process pipeline, generally, as illustrated in FIG. 2. The conduit was generally parallel to the column for a height (length) of about 43 feet. Water was placed in the column and conduit which resulted in a height of about ten feet in the column and about nine feet in the conduit.

The process stream in the pipeline contained the following components at a temperature of about 40 degrees C. and a pressure of about 15.2 psia.

| Components | lbs/hr |
|---|---|
| gaseous hydrocarbons | ~3277 |
| liquid hydrocarbons | ~4099 |
| water | ~4408 |

The density of the process stream was about 0.07890 lb/ft$^3$. A gaseous hydrocarbon purge stream having a density of about 0.0723 lb/ft$^3$ was flowed through the top of the conduit at a rate of about 34 lb/hr at 26 degrees C. and 73.7 psia.

A compressor downstream from the process pipeline shut down causing a pressure buildup in the process pipeline. When the pressure reached about 4.8 psig, the gasses were relieved. The pressure in the pipeline remained at about 4.8 psig until the compressor was restarted and normal operations resumed.

What is claimed is:

1. A pressure relief device for a process or pipeline comprising a vertical column having a level of seal-liquid therein and a conduit in fluid communication with the column and attached to the column near the bottom of the column and generally extending upward to a predetermined distance from the bottom to a point wherein the conduit is in fluid communication with the pipeline, the conduit having a level of seal-liquid therein, the column having a diameter larger than the diameter of the conduit, the column having a diameter and height large enough to prevent a gas flowing at a maximum relieving rate from blowing the seal-liquid from the column.

2. The device of claim 1 wherein the level of liquid in the column is controlled at a predetermined height.

3. The device of claim 1 wherein the conduit comprises a bottom, a middle and a top portion, said bottom portion disposed generally linear attached generally perpendicular to the column, a generally linear middle portion generally parallel to the column and an inverted U-shaped top portion attached to the pipeline.

4. The device of claim 1 wherein the liquid level in the conduit is dependent upon the column liquid level, the pressure in the pipeline, and the density of the liquid.

5. The device of claim 1 wherein the conduit slopes upward at a predetermined angle from the column to the pipeline.

6. The device of claim 1 wherein the vertical column is open to the atmosphere near the top of the column.

7. The device of claim 1 wherein the vertical column is connected to a relief header near the top of the column to prevent release of process fluid into the atmosphere when the pressure in the process or pipeline is relieving.

8. The device of claim 1 wherein the vertical column is connected to a flare near the top of the column.

9. The device of claim 1 wherein the vertical column is closed to the atmosphere at the top of the column to prevent release of process fluid into the atmosphere when the pressure in the process or pipeline is relieving.

10. A pressure relief device for a process or pipeline comprising a vertical column having a level of liquid therein and a conduit in fluid communication with the column and attached to the column near the bottom of the column and generally extending upward to a predetermined distance from the bottom to a point wherein the conduit is in fluid communication with the pipeline, the conduit having a level of liquid therein, the column having a diameter and height large enough to prevent entrainment of the liquid when the pressure in the pipeline is relieving, the column containing a tube member for removing a top layer of undesirable components formed on the surface of the liquid in the column.

11. A pressure relief device for a process or pipeline comprising a vertical column having a level of liquid therein and a conduit in fluid communication with the column and attached to the column near the bottom of the column and generally extending upward to a predetermined distance from the bottom to a point wherein the conduit is in fluid communication with the pipeline, the conduit having a level of liquid therein, the column having a diameter and height large enough to prevent entrainment of the liquid when the pressure in the pipeline is relieving, the conduit containing a tube member for removing a top layer of undesirable components formed on the surface of the liquid in the conduit.

* * * * *